(12) United States Patent
Zale

(10) Patent No.: US 10,842,141 B2
(45) Date of Patent: Nov. 24, 2020

(54) ADJUSTABLE FISHING EQUIPMENT MOUNT

(71) Applicant: Craig Zale, Lucas, TX (US)

(72) Inventor: Craig Zale, Lucas, TX (US)

( * ) Notice: Subject to any disclaimer, the term of this patent is extended or adjusted under 35 U.S.C. 154(b) by 49 days.

(21) Appl. No.: 15/194,087

(22) Filed: Jun. 27, 2016

(65) Prior Publication Data

US 2017/0367311 A1 Dec. 28, 2017

(51) Int. Cl.
*A01K 97/10* (2006.01)
*A01K 97/06* (2006.01)
*A01K 89/00* (2006.01)
*B63B 35/73* (2006.01)
*B63B 17/00* (2006.01)

(52) U.S. Cl.
CPC .............. *A01K 97/10* (2013.01); *A01K 89/00* (2013.01); *A01K 97/06* (2013.01); *B63B 2017/0054* (2013.01); *B63B 2035/738* (2013.01)

(58) Field of Classification Search
CPC .................................................... A01K 97/10
USPC ......................................................... 43/21.2
See application file for complete search history.

(56) References Cited

U.S. PATENT DOCUMENTS

| | | | | |
|---|---|---|---|---|
| 923,596 A * | 6/1909 | Staples | ..................... | A47C 7/66 135/16 |
| 1,520,543 A * | 12/1924 | Meachen | ............... | A01K 97/10 114/364 |
| 1,789,509 A * | 1/1931 | Bergstrom | ............. | A01K 97/10 248/276.1 |
| 1,963,463 A * | 6/1934 | Hammer | ................. | A01K 97/10 114/364 |
| 2,481,272 A * | 9/1949 | Williams | ............... | A01K 97/10 248/514 |
| 2,995,855 A * | 8/1961 | Bell | ........................ | A01K 97/10 43/21.2 |
| 3,006,588 A * | 10/1961 | Lemi | ...................... | A01K 97/10 248/126 |
| 3,159,366 A * | 12/1964 | Knight | ................... | A01K 97/10 248/314 |
| 3,162,408 A * | 12/1964 | Markman | .............. | A01K 97/10 248/515 |
| 3,178,032 A * | 4/1965 | Patrick | ................... | A01K 97/10 211/70.8 |
| 3,564,753 A * | 2/1971 | Fravel | .................... | A01K 97/10 248/518 |
| 3,669,390 A * | 6/1972 | Nielson | .................. | A01K 97/10 248/156 |
| 3,802,652 A * | 4/1974 | Holton, Jr. | ............. | A01K 97/10 248/315 |
| 4,541,196 A * | 9/1985 | Jershin | ................... | A01K 97/10 43/16 |

(Continued)

*Primary Examiner* — Christopher P Ellis
(74) *Attorney, Agent, or Firm* — Thrasher Associates

(57) ABSTRACT

The present invention relates to a pivotably adjustable fishing equipment mount, particularly embodied with a fishing rod holder that can be swivelled to different angles and fixed at variable positions as per the user requirement. It is attachable to the gunwale of a fishing boat, and capable of being adjusted to different angles. Further, the mount can be moved completely inside the boat while remaining attached to the boat. In one embodiment, the mount flips (or pivots) into the interior of the boat so that the boat can be covered by a boat cover tarp without obstruction.

2 Claims, 4 Drawing Sheets

(56) References Cited

U.S. PATENT DOCUMENTS

| | | | | |
|---|---|---|---|---|
| 5,187,892 | A | * | 2/1993 | Gutierrez ............... A01K 97/10 248/156 |
| 6,318,018 | B1 | * | 11/2001 | Weaver ................. A01K 97/10 43/21.2 |
| 8,453,373 | B2 | * | 6/2013 | Gordon .................. A01K 97/10 248/534 |
| 9,586,657 | B1 | * | 3/2017 | Dykes .................... A01K 97/10 |
| 2015/0223440 | A1 | * | 8/2015 | Schmaus ................ A01K 97/10 43/4.5 |
| 2015/0272104 | A1 | * | 10/2015 | Shaw, Jr. ............... A01K 97/10 43/21.2 |
| 2017/0196212 | A1 | * | 7/2017 | Tuck ...................... A01K 97/10 |

* cited by examiner

ADJUSTABLE FISHING EQUIPMENT MOUNT

TECHNICAL FIELD OF THE INVENTION

The present invention relates to fishing equipment mounts, and in particular to fishing rod mounts.

STATEMENT OF A PROBLEM ADDRESSED BY THE INVENTION

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

When people fish, sometimes they bait their line and secure their fishing rod to a surface. One popular method is to attach a fishing rod mount ("the mount", which is sometimes referred to as a "fishing rod holder" or "holder") to a gunwale of a boat. In a dissimilar art, a boat owner protects the boat with a boat cover tarp during both transport and/or storage.

Unfortunately, when the fishing is over and the fishing rods are removed from the mount, the mount itself prevents the boat cover tarp (or any other protective sheet) from being secured to the boat. So, boat owners have to remove the mount by hand, which is both time consuming and "strips" the threading from the holes in the gunwale of the boat. This diminished hull integrity, and often requires the boat owner to create new holes to secure the mount the next time the mount is used. Additionally, each time the mount is removed, it may be misplaced. Further, the detached mount may accidentally slip over the boat rail and into the water.

Accordingly, what is needed, is a device that enables boat owners to quickly position a mount for use with a fishing rod, but then quickly take the mount away from interfering with the attachment of a boat cover. The present invention provides this solution.

Discussion of Related Art

Various mounts and holders are available which allow the fishermen to mount their fishing rods onto the surface of a boat. Some mounts are also able to carry large fishing apparatuses and can be used for extra storage. One such mount is shown in U.S. application number 2004/0040197 which discloses a fishing rod holder having a self-biasing mechanism for easy reeling of fish. The rod holder comprises a platform assembly and two hinged base members mounted on the surface of the boat. However, the mount and the platform is not detachable or rotatable.

Other fishing rod holders attach onto a boat's surface so as to pivotally move to different angles suitable for fishing. One such fishing rod holder is shown in U.S. Pat. No. 3,570,793 wherein the fishing rod holder can be tilted to fix the fishing rod in a desired position with respect to the boat gunnel. However, the whole process of assembling and dismantling the holder is time consuming. Another similar rod holder is shown in U.S. patent application number 2004/0089218 which discloses a pivotally mounted boat rack that can be rotated to various positions inside and outside the boat hull. Although, the boat rack can carry articles, not necessarily fishing rods, it does not provide mechanism to orient the fishing rod in a proper position suitable for fishing. Furthermore, the boat rack needs to be completely detached and stored separately when not in use.

Some holders provide support for a plurality of fishing rods, but must be dismantled and stored separately. One such holder is shown in U.S. Pat. No. 6,289,627 disclosing a stowable fishing rod holder with hinged arms which can be folded for storage when not in use. However, it needs to be completely removed for storage in boat compartments. The process of removing the mount and installing it again for use is also time consuming.

Some other references found which are typical of the prior art in these areas include U.S. Pat. No. 6,866,001, disclosing a foldaway transport boat platform that has pivoting hinge brackets; and U.S. Pat. No. 6,052,937 disclosing fishing rod holder that includes a base member comprising a rectangular plate with pivotally mounted multiple tubular holders. None of these platforms or rod holders have the mechanism for facilitating easy assembly and dismantling for fishing and storage purpose. Hence, there is a need of an improved device or mechanism of fishing rod mount that has simple and easy provisions of storage and assembly.

SUMMARY OF THE INVENTION

The invention provides a device embodied as a fishing equipment mount that is able to swivel through angles of approximately 270° across a vertical plane. The mount holds a fishing rod holder while fishing, and can be flipped back inside the boat when not in use. In one embodiment swiveling is achieved via a hinge. This mechanism enables a user to protect the boat with a cover without having to completely detach the mount from the boat.

In an alternative embodiment, the fishing equipment mount is adapted to hold plurality of fishing equipment, including a plurality of fishing rod holders.

In another alternative embodiment the fishing equipment mount can be permanently fixed onto the gunwale of the boat.

In another alternative embodiment the fishing equipment mount can be detachably fixed onto the gunwale of the boat.

BRIEF DESCRIPTION OF THE DRAWINGS

Various aspects of the invention, as well as the embodiments, are better understood by reference to the following detailed description. For better understanding of the invention, the detailed description should be read in conjunction with the drawings in which.

EXEMPLARY EMBODIMENT

Interpretation Considerations

Figure 1:
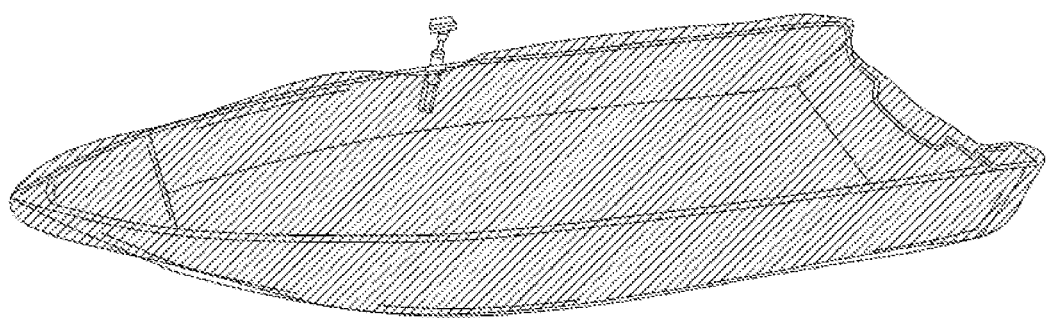
FIG. 1 (Prior Art) illustrates prior art wherein a non-flipping fishing rod holder obstructs complete covering of the boat with a boat cover tarp.

When reading this section (which describes an exemplary embodiment of the best mode of the invention, hereinafter "exemplary embodiment"), one should keep in mind several points. First, the exemplary embodiment is what the inventor believes to be the best mode for practicing the invention at the time of patent filing. Since one of ordinary skill in the art may recognize substantially equivalent structures or substantially equivalent acts to achieve the same results in the same way in light of the following exemplary embodiment, or to achieve the same results in a not dissimilar way; the following exemplary embodiment should not be interpreted as limiting the invention to one embodiment.

Likewise, individual aspects (sometimes called species) of the invention are provided as examples. Accordingly, one of ordinary skill in the art may recognize from a following exemplary structure (or exemplary act) a substantially equivalent structure or substantially equivalent act to either achieve the same results in substantially the same way, or to achieve the same results in a not dissimilar way.

Accordingly, the discussion of a specific item invokes the class of items to which that item belongs as well as related items in that class. Furthermore, it is recognized that as technology develops, a number of additional alternatives to achieve an aspect of the invention may arise. Such advances are hereby incorporated within their respective class, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential.

Third, a function or an act should be interpreted as incorporating all modes of doing that function or act, unless otherwise explicitly stated. (For example, one recognizes that "tacking" may be done by nailing, stapling, gluing, hot gunning, riveting, etc., and so a use of the word tacking also means stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense.

Fifth, the words "means" and "step" are provided to facilitate the reader's understanding of the invention and do not mean "means" or "step" as defined in § 112, paragraph 6 of 35 U.S.C., unless used as "means for—functioning—" or "step for—functioning—" in the Claims section.

Sixth, the invention is also described in view of the Festo and Bilski decisions, and, in that regard, the claims and the invention incorporate equivalents known, unknown, foreseeable, and unforeseeable.

Seventh, the language and each word used in the invention should be given the ordinary interpretation of the language and the word, unless indicated otherwise.

As will be understood by those of ordinary skill in the art, various structures and devices are depicted in block diagram form in order to avoid unnecessarily obscuring the invention. It should be noted in the following discussion that acts with like names are performed in like manners, unless otherwise stated.

Of course, the foregoing discussions and definitions are provided for clarification purposes and are not limiting. Words and phrases are to be given their ordinary plain meaning unless indicated otherwise.

DESCRIPTION OF THE DRAWINGS

FIG. 1 (Prior Art) illustrates prior art wherein a prior art non-flipping fishing rod holder obstructs complete covering of the boat with a boat cover tarp. From this view it is seen that water and debris can enter the boat via the gap between the boat cover tarp and the side of the boat.

Figure 2:
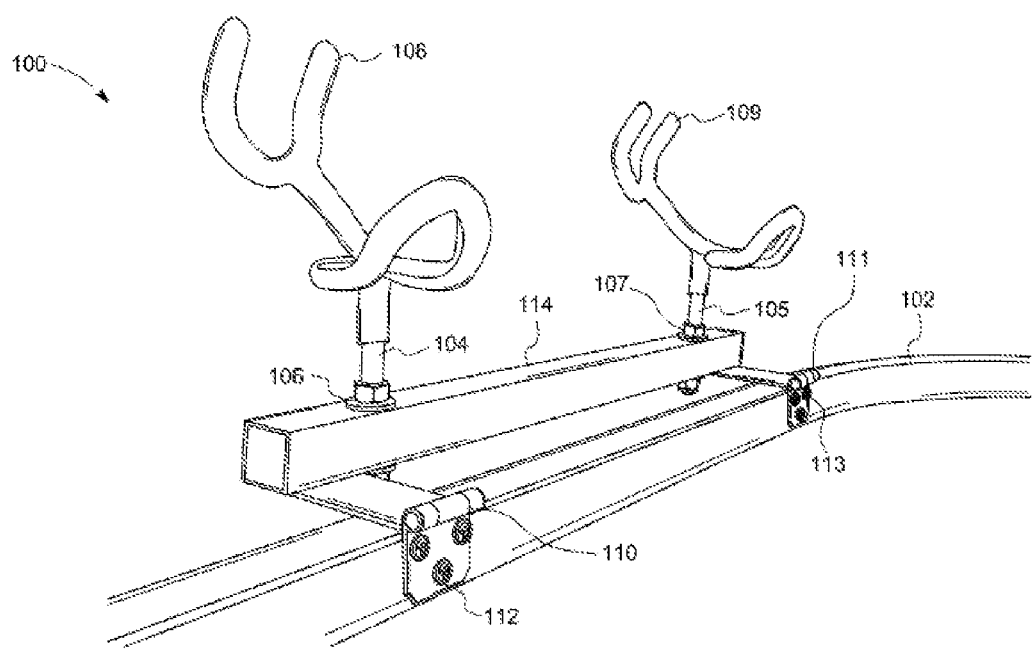
FIG. 2 illustrates the isometric view of the fishing equipment mount when fishing equipment is being used.

FIG. 2 shows an isometric view of a fishing equipment mount 100, which generally comprises a mounting base 114, at least one fishing equipment holder (108, 109) and boat mounts 112, 113 that are rotatably coupled to the mounting base 114 via connecting elements 110,111. Additionally, the mounting base 114 preferably supports a first fishing equipment holder 108 and a second fishing equipment holder 109. Preferably, the fishing equipment holders 108, 109 are fishing rod holders, however, it should be understood that alternative attachments to the mounting base 114 are known to those of ordinary skill in the art. The fishing equipment attached to the mounting base can be storage holder, reel case holder, hook(s), or any other type of holder necessary to carry any suitable material in the boat.

The mounting base 114 is preferably made of aluminum, stainless steel, fiberglass or any composite material which are easily machined. Moldable or machineable plastics of all nature and composites of fibrous reinforced resinous materials can also be used as material for the mounting base 114. Additionally, the material for the mounting base 114 should be light weight and preferably resistive to corrosion, deposition of water residue and other impacts of water on metallic surfaces. The mounting base 114 should be in a rigid form—here shown as a rectangular prism. Alternatively, the mounting base 114 can be cylindrical with a flat top surface portion.

A fishing apparatus can be coupled to the fishing equipment holders 108, 109. In a preferred embodiment, the fishing apparatus is a fishing rod. Alternative to the fishing rod, any type of other fishing apparatus can be coupled to the fishing equipment holders 108, 109, including reel case, bait case, tackle bags, or other material to be supported outside of the boat.

The mounting base 114 is attached onto the gunwale of the boat by connecting elements 110, 111 which allow the mounting base to be flipped in and out of the boat. Preferably, the connecting elements 110, 111 are hinge modules adapted to rotate the mounting base 114 through 270° and enable swivel movement of the fishing equipment mount 100. Alternatively, the connecting elements can be rotating hooks, brackets, clamps, or any other suitable mechanical fastener capable of enabling swivel movement. Additionally, the connecting elements 110, 111 are coupled onto the gunwale 102 by means of boat mounts 112, 113. The boat mounts 112, 113 can be screws, nuts, bolts, ratcheted means or any other means of secure attachment acceptable without departing from the invention.

The fishing equipment holders 108, 109 may be attached to the mounting base 114 via supporting arms 104, 105. In one embodiment, the support arms are threaded at each end and twisted into both their respective equipment holders 108, 109 and also attached to the mounting base 114. To attach to the mounting base 114, the threads of each supporting arm 104, 105 fit through channels in the mounting base 114 and then secured thereto mechanical fasteners 106, 107. These mechanical fasteners can be screws, nuts, bolts, washer assembly pairs, or any other suitable mechanical securing means.

The fishing equipment holders 108, 109 can be fixed, detachable or movable around any axis. To enable movement of the fishing equipment holders 108, 109 the supporting arms 104, 105 can be mechanically modified to include multiple connections or pivot points that allow the fishing equipment to move into various positions and orientations.

Alternatively, the supporting arms 104, 105 and mechanical fasteners 106, 107 can be suitably modified to provide a detachable connection of the fishing equipment holders 108, 109 with the mounting base 114.

Figure 3:
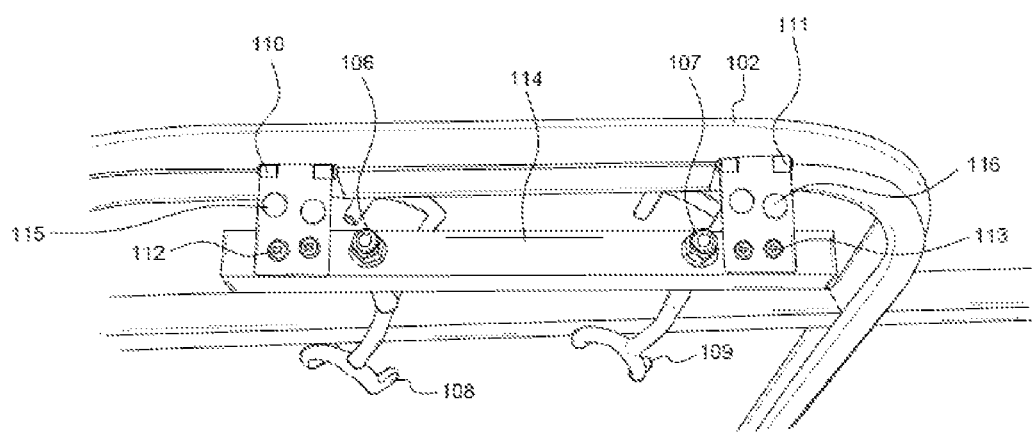
FIG. 3 illustrates the isometric view of the fishing equipment mount when fishing equipment is not being used, and when the mounting base member is flipped inside of the boat.

FIG. 3 illustrates the fishing equipment mount 100 folded or flipped inside the boat for transport and storage. Here, the mounting base 114 is moved inside the boat via the hinge modules 110, 111 and the fishing equipment holders 108, 109 are resting on the inside of the boat. This leaves the outside surface of the boat unobstructed to receive a boat cover, tarp or other protective covering. Moreover, the flipped-in fishing equipment mount 100 facilitates easy storage and recovery.

To reduce damage of the gunwale surface during fishing activity while the fishing equipment mount 100 is flipped out of the boat, the mounting base 114 contains protection pads 115, 116 as shown in FIG. 3. These protection pads 115, 116 prevent scratches or any other disintegration of the gunwale surface which may result from the contact of the mount 100 with the gunwale. The protection pads 115, 116 may be made of flexible plastic, rubber, or any other suitable material. Further, the protection pads may be affixed onto the mounting base by adhesives, double-sided tape, or any other suitable adhesion means.

The mounting base 114 may be coupled to the gunwale 102 via the hinge modules 110,111 and boat mounts 112, 113. Thereafter, the mounting base 114 may swivel around the gunwale 114, providing "permanent" attachment to the gunwale.

Figure 4:
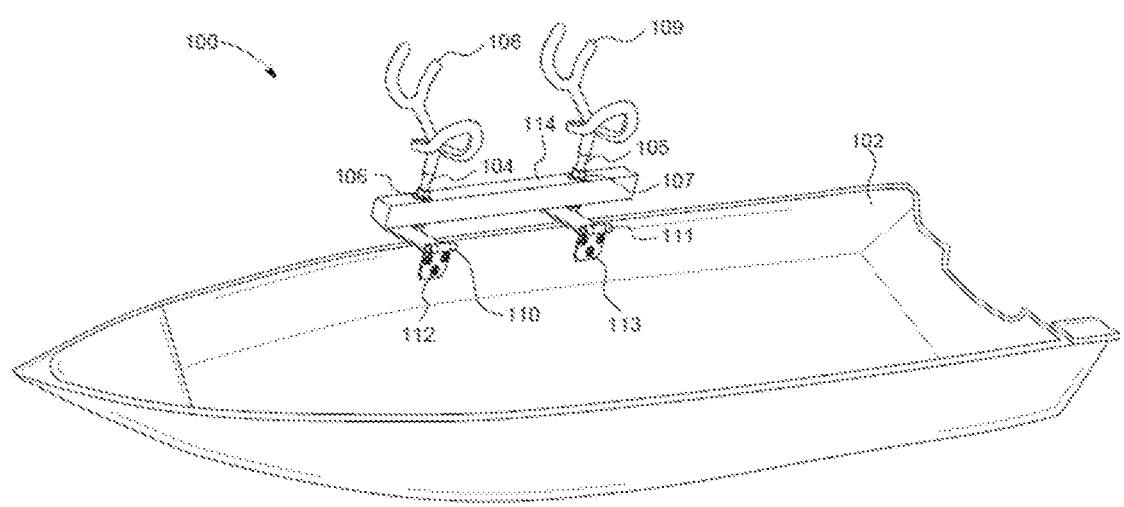
FIG. 4 illustrates the isometric view of the fishing equipment mount attached onto the gunwale of a boat.

FIG. 4 illustrates the isometric view of the fishing equipment mount 100 attached onto the gunwale of a boat and flipped outside. A suitable fishing apparatus, such as fishing rod, can be coupled to the fishing equipment holders 108, 109 for carrying out fishing activity. The fishing equipment mount 100 can be fixed permanently onto the gunwale of the boat. Alternatively, the fishing equipment mount 100 can be detachably coupled onto the gunwale of the boat.

Of course, while the specification above is specifically applied to fishing rod holders and fishing boats, the invention is applicable to any type of boats and holders that are capable of carrying out fishing activity. Thus, though this invention has been described with respect to a specific preferred embodiment, many advantages, variations and modifications will become apparent to those skilled in the art upon reading the present application. It is therefore the intention that the appended claims and their functional equivalents be interpreted as broadly as possible in view of the prior art to include all such variations and modifications.

What is claimed is:

1. A boat-attachable fishing equipment mount, comprising:
    a rigid and generally rectangular-prism-shaped mounting base having a length;
    a first fishing equipment holder coupled to the mounting base, the first fishing equipment holder for securely holding a fishing rod thereto;
    a first connecting element having a mounting base attaching portion, a pivoting portion, and a first boat mount portion;
    the mounting base coupled to the connecting element via the mounting base attaching portion and positioned generally opposite the fishing equipment holder;
    the connecting element being coupled to a boat gunwale via the first boat mount portion such that the boat-attachable fishing equipment mount is affixed to the gunwale, and
    such that the fishing equipment mount is rotatable through a plane perpendicular to the length of the mounting base so that the fishing equipment mount may be alternatively rotated outside of the boat at a desired angle, or inside the boat such that the fishing equipment mount does not impede a boat tarp when the boat tarp is placed over a boat having the fishing equipment mount installed thereon.

2. A boat-attachable fishing equipment mount, comprising:
    a rigid and generally cylindrical mounting base having a length;
    a first fishing equipment holder coupled to the mounting base, the first fishing equipment holder for securely holding a fishing rod thereto;
    a first connecting element having a mounting base attaching portion, a pivoting portion, and a first boat mount portion;
    the mounting base coupled to the connecting element via the mounting base attaching portion and positioned generally opposite the fishing equipment holder;
    the connecting element being coupled to a boat gunwale via the first boat mount portion,
    such that the fishing equipment mount is rotatable through a plane perpendicular to the length of the mounting base so that the fishing equipment mount may be alternatively rotated outside of the boat at a desired angle, or inside the boat such that the fishing equipment mount does not impede a boat tarp when placed over a boat having the fishing equipment mount installed thereon, and also having
    an interlocking member to engage the connecting member at a first desired angle to hold the mounting base member at a pre-defined position.

\* \* \* \* \*